Patented Feb. 20, 1940

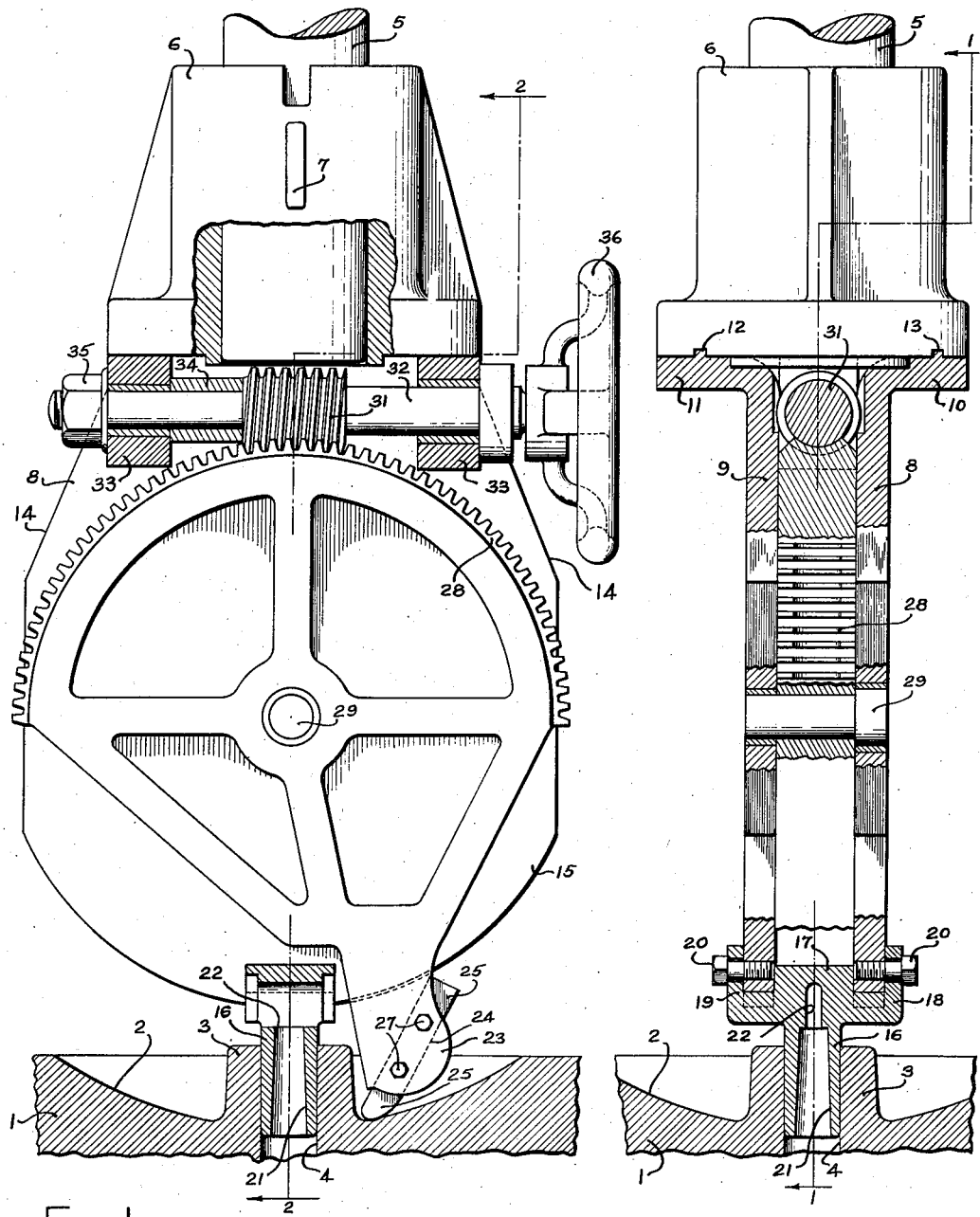

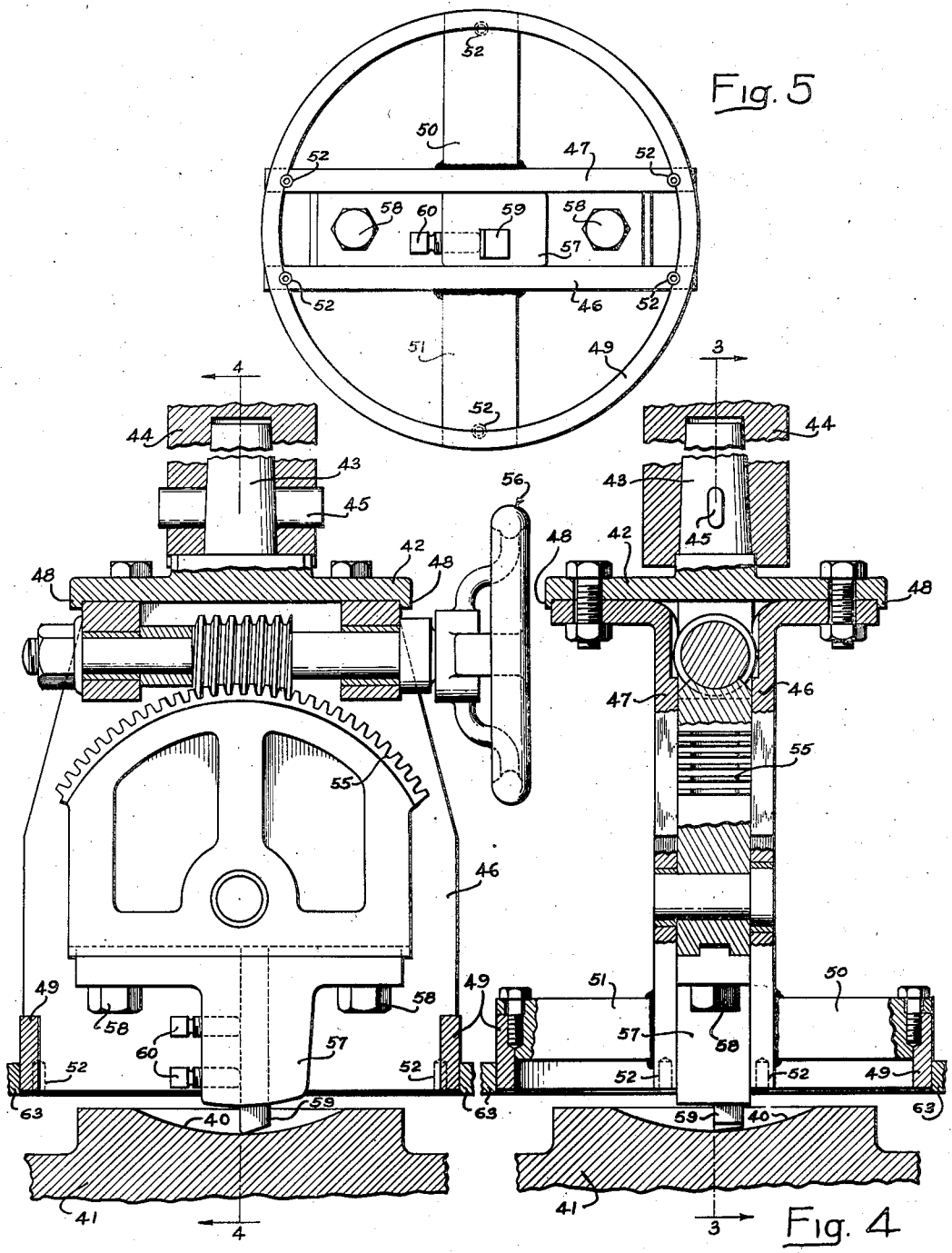

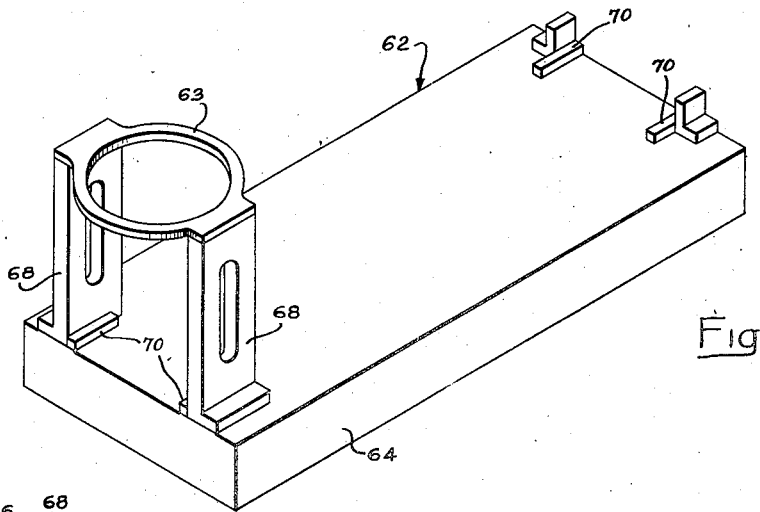
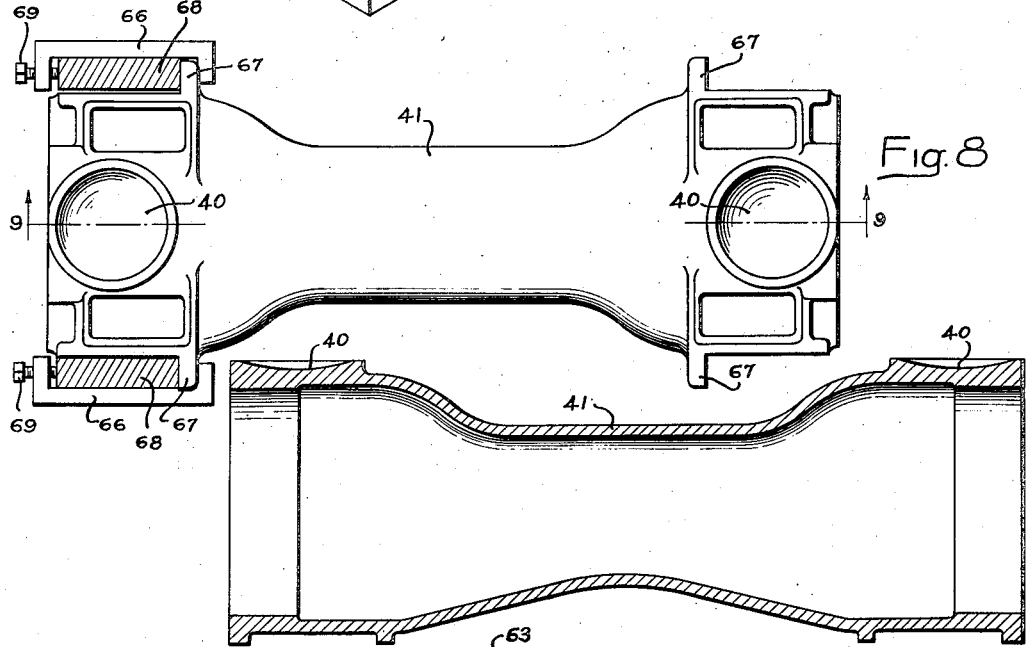
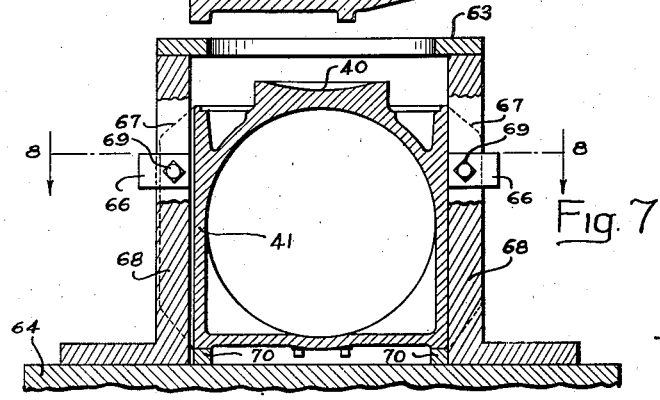

2,191,409

UNITED STATES PATENT OFFICE 2,191,409

MACHINING APPARATUS

James F. McMenamin, Philadelphia, Pa.

Application November 24, 1937, Serial No. 176,301

2 Claims. (Cl. 77—58)

This invention relates generally to machine tool equipment and particularly to an improved tool holder which is especially applicable for machining semi-spherical seats on locomotive parts such as trailer truck frames and axle housings for truck and locomotive wheels, although the principles of construction and operation of my improved apparatus may be used for machining other products.

Present-day locomotive truck frames, axle housings and other parts are commonly made in a single integral casting which may be of relatively large size when used with certain types of locomotives. Trailer trucks are usually connected to the main locomotive frame through a semi-spherical ball and seat and a similar ball and seat are provided between an axle housing and the spring rigging system, it being desirable to form the seats directly in the truck frame and axle housing. In such instances, the amount of spherical machining is relatively small compared to the size of the castings, and yet the size or shape of the casting makes it uneconomical to rotate the casting about a stationary tool.

It is an object of my invention to provide improved machine tool equipment for readily and efficiently machining a semi-spherical surface in a relatively large and massive structure or other parts which cannot be conveniently or economically rotated about a stationary tool.

Another object is to provide an improved radius tool holder having improved means for supporting and feeding a cutting tool so as to form efficiently and conveniently a semi-spherical seat.

A further object is to provide an improved tool holder adapted to be adjusted for cutting semi-spherical surfaces of various predetermined radii.

Other objects have to do with providing an improved radius tool holder that is sturdy and economical in construction, is adapted to be conveniently mounted on a rotating spindle of any suitable vertical or horizontal machine tool, and has compact and rugged means for feeding the cutting tool as it is rotatably driven.

Other objects and advantages will be more apparent to those skilled in the art from the following description of the accompanying drawings in which:

Fig. 1 is a side elevation of one form of my improved tool holder with parts broken away to show details of construction, this view being taken substantially on the line 1—1 of Fig. 2;

Fig. 2 is a partial sectional view taken substantially on the line 2—2 of Fig. 1;

Fig. 3 is a view similar to Fig. 1 but showing a modified arrangement for guiding the tool holder by a fixture rather than by the work piece as in Fig. 1, this figure being taken substantially on the line 3—3 of Fig. 4;

Fig. 4 is a sectional view taken substantially on the line 4—4 of Fig. 3 with certain parts broken away to show details of construction;

Fig. 5 is a bottom plan view of Fig. 3 looking upwardly;

Fig. 6 is a perspective view of a fixture and tool holder guide for machining an axle housing of a locomotive driving wheel;

Fig. 7 is a transverse sectional view through the guiding end of the fixture shown in Fig. 6 together with the axle housing disposed therein;

Fig. 8 is a sectional view taken substantially on the line 8—8 of Fig. 7; and

Fig. 9 is a vertical section of an axle housing taken substantially on the line 9—9 of Fig. 8.

In the particular embodiments of the invention, such as are disclosed herein merely for the purpose of illustrating certain specific forms among possible others that the invention might take in practice, I have shown in Fig. 1 a fragmentary portion 1 of a locomotive trailer truck or other large casting or part in which it is desired to machine a semi-spherical surface or seat 2. In this particular structure a central boss or lug 3 is provided with an opening 4 to receive a bolt for holding a ball in operative relation to seat 2. The opening 4 is initially drilled in the casting preferably by using my improved tool holder in a manner to be described. The tool holder will be described for a vertical spindle although it may be applied to a horizontal one.

My improved tool holder specifically comprises a frame having a head 6 suitably supported on an axially adjustable machine spindle 5 and preferably removably secured thereto by a transverse wedge key 7 while secured to and depending from the lower surface of head 6 are two relatively heavy side plates 8 and 9 provided with supporting flanges 10 and 11 which are bolted to head 6. Key and keyways 12 and 13 hold the side plates 8 and 9 in fixed relation to the head during rotation of the tool holder. The side plates 8 and 9 flare outwardly as indicated at 14 while the lower ends of the plates are curved as at 15 is desired. In addition to the foregoing frame, there may if desired be supported between the spaced side plates 8 and 9 at their lowermost end a pilot stem 16 normally adapted to have a running bearing fit with bore 4. This pilot stem is provided with a central boss 17 and side flanges 18 and 19 secured to side plates 8 and 9 by bolts 20. The boss 17 and flanges 18 and 19 are spaced apart and shaped to firmly receive the flat sides of the side plates.

The pilot stem 16 is also provided with a tapered bore 21 to receive the shank of a drill to permit the foregoing drilling operation of bore 4. A drift pin opening 22 is provided in boss 17 to effect removal of a drill after which the tool holder is lowered so that pilot stem 16 is journalled in passage 4.

A cutting tool head 23 has a slot 24 in which a tool 25 is secured by bolts 27 or other usual means for holding a tool. Means for carrying the tool head 23 for arcuate movement, comprises a worm gear segment 28 journalled between side plates 8 and 9 on a pin 29, the lower portion of this segment extending downwardly to form the tool head 23. To feed the cutting tool 25 inwardly to form a semi-spherical surface 2 in the work piece and also to hold the tool in any given radial cutting position, a worm 31 meshing with gear 28 is mounted upon a shaft 32. This shaft is journalled in suitable bearing blocks 33 interposed between side plates 8 and 9 while a suitable collar 34 and nut 35 hold the shaft and worm in axial position. A hand wheel 36 is adapted to permit manual rotation of worm 31 and accordingly cause worm segment 28 to swing cutting tool 25 along the semi-spherical surface 2.

The operation is believed to be apparent from the foregoing disclosure, but it will be pointed out that rotation of machine tool spindle 5 causes rotation of head 6 and side plates 8 and 9, the cutting tool 25 being initially positioned outside of the range of the work piece but with pilot stem 16 disposed in bore 4. During each successive rotation of the tool holder, the operator will rotate hand wheel 36 sufficiently to cause cutting tool 25 to progressively feed radially inwardly toward boss 3. If it is desired to machine the periphery of boss 3, machine tool spindle 5 may be moved upwardly in any usual manner thereby causing cutting tool 25 as it rotates around boss 3 to machine its surface. Throughout these operations my improved tool holder is firmly held in lateral relation to the work piece through the pilot stem 16 and at the same time the tool has maximum flexibility in its feeding movement so as to permit a light or heavy cut to be made as desired. It will be understood that machine tool spindle 5 is normally held at one elevation during any given cut. However, successive cuts are made by lowering the elevation of the machine tool spindle 5. During such operations the radius of the semi-spherical seat 2 is never changed no matter how deep the cutting operation may be because said radius is determined by the distance from the axis of shaft 29 to the furthermost cutting edge of cutting tool 25. By moving the cutting tool 25 inwardly or outwardly relative to its pivot 29, it is possible to obtain a wide range of different radii.

The modification shown in Figs. 3 to 5 is for the purpose of machining a semi-spherical surface 40 in a work piece 41 which is not provided with a bore 4 such as in the modification of Fig. 1. Such a work piece may be an axle housing for truck wheels or locomotive driving wheels. One form of such housing is shown in Figs. 8 and 9 which specifically is adapted for roller bearing housings. The tool holder in this instance comprises a frame having preferably a flat adapter head 42 of circular form provided with a tapered shank 43 which is received in a machine tool spindle 44. A key 45 may be used to positively hold shank 43 in position. The upper ends of side plates 46 and 47 are generally similar to side plates 8 and 9 although the head 42 has outer flanges 48 to assist in holding the side plates 46 and 47 instead of the keys and keyways 12 and 13 of the preferred form. The lower ends of side plates 46 and 47 extend straight down and are connected by an annular bearing ring 49 which as shown in the bottom plan view of Fig. 5 is connected to the edges of the side plates 46 and 47 and is further connected thereto by a pair of radial supporting arms 50 and 51. The ring 49 is suitably dowelled or keyed to the side plates and arms 50 and 51 as by pins 52, thereby insuring the ring to be maintained coaxial with the axis of rotation of the tool holder. The worm gear segment 55 is journalled between the side plates and is adjusted by a worm and hand wheel generally indicated at 56 in the same manner as the Fig. 1 modification. However, the lower portion of worm gear segment 55 is provided with a tool head 57 removably secured thereto by bolts 58. A cutting tool 59 is preferably received and held in a vertical socket of head 57 as by set screws 60. Various length of tool heads 57 may be used for different radii, in addition to adjustment of the cutting tool in its socket. This modification thus has the advantage of permitting a very wide range of radii merely by removing one head and substituting another.

To insure maximum accuracy in the use of this form of my improved tool holder, I preferably provide supplemental means 62 as shown in Fig. 6. While the specific character of this means may vary in accordance with the nature of the work piece, yet the general principles will be the same in that a guide ring 63 is supported in any suitable manner upon a base or other member 64 to permit the axle housing 41 to be properly positioned and held beneath guide 63. Thereupon as shown in Figs. 3 and 4 my tool holder may be lowered into guide 63 so that annular ring 49 will engage the same with a suitable running fit to properly steady and guide the tool holder during cutting of the semi-spherical seat 40. The work piece 41 may be held in any suitable manner although in this specific instance a pair of horizontal U-shaped clamps 66 engage axle housing flanges 67 to hold the same firmly against vertical supports 68, Fig. 6. The other ends of the U-shaped clamp 66 are provided with screws 69 engaging the front edges of the vertical supports 68. After the spherical seat 40 is machined at one end of the axle housing, the same is removed and a corresponding seat machined at the other end. Suitable guides 70 insure uniform positioning of the axle housing during the machining operation. The tool holder is operated with a high degree of stability due to the guide ring 63 which, however, does not in any way restrict the flexibility in adjusting the elevation of the tool holder to obtain any desired depth of cut.

It will of course be understood that various changes in details of construction and arrangement of parts may be made by those skilled in the art without departing from the spirit of the invention as set forth in the appended claims.

I claim:

1. In combination, an axially extending frame adapted for rotation, an annular ring supported by and surrounding a lower portion of said frame for rotation therewith, a cutting tool head disposed at least partly within said ring and pivotally supported by said frame, and means for radially adjusting said cutting tool head to effect feeding thereof during a machining operation.

2. The combination set forth in claim 1 further characterized by the provision of a guiding ring for axially receiving but radially guiding said annular ring thereby to stabilize the lower end of said frame during a cutting operation.

JAMES F. McMENAMIN.